United States Patent [19]
Matsumoto et al.

[11] Patent Number: 6,020,708
[45] Date of Patent: Feb. 1, 2000

[54] POSITIONING APPARATUS

[75] Inventors: Takashi Matsumoto; Yoshinori Satoh, both of Kanagawa-ken; Hiroyuki Ureshino, Tokyo, all of Japan

[73] Assignee: Nissan Motor Co., Ltd., Tokyo, Japan

[21] Appl. No.: 08/746,348

[22] Filed: Nov. 8, 1996

[30] Foreign Application Priority Data

Nov. 8, 1995 [JP] Japan .................................. 7-314677

[51] Int. Cl.[7] .................................................. G05B 19/29
[52] U.S. Cl. ..................... 318/601; 318/626; 318/282; 318/286; 318/468
[58] Field of Search ..................... 318/560, 561, 318/569, 600–603, 626, 636, 280–283, 286, 445–6, 449, 466–470, 478–479

[56] References Cited

U.S. PATENT DOCUMENTS

| | | | |
|---|---|---|---|
| 3,727,120 | 4/1973 | Jewell et al. | 318/636 |
| 4,300,080 | 11/1981 | Lee | 318/563 |
| 4,313,074 | 1/1982 | Nomura et al. | 318/608 |
| 4,629,952 | 12/1986 | Shimizu | 318/432 |
| 4,902,953 | 2/1990 | Kraft et al. | 318/663 |
| 4,974,776 | 12/1990 | Oshizawa | 236/13 |
| 5,027,611 | 7/1991 | Doi et al. | 62/158 |
| 5,132,602 | 7/1992 | Jorgensen et al. | 318/608 |
| 5,801,939 | 9/1998 | Okazaki | 318/560 |

FOREIGN PATENT DOCUMENTS

| | | | |
|---|---|---|---|
| 0 300 722 B1 | 1/1989 | European Pat. Off. | B60H 1/00 |
| 0 300 761 B1 | 1/1989 | European Pat. Off. | B60H 1/00 |

OTHER PUBLICATIONS

Patent Abstracts of Japan, vol. 009, No. 182 (P–376), Jul. 27, 1985 & JP 60 054022 A, Mar. 28, 1985.

Patent Abstracts of Japan, vol. 008, No. 269 (P–319), Dec. 8, 1984 & JP 59 136815 A, Aug. 6, 1984.

*Primary Examiner*—David Martin
*Attorney, Agent, or Firm*—Foley & Lardner

[57] ABSTRACT

A stop range setting circuit sets a range of permissible positions around where the control object is desired to be stopped on the basis of a target position signal, and a potentio balance resistor (PBR) detects a present position of the control object driven by a motor. The comparison circuit compares the present position of the control object with the set range, and outputs an out-of-stop range signal and a rotating direction indication signal until the control object reaches the range. The out-of-stop range signal is input to a drive start determination circuit, and a drive permission signal is output to a drive circuit when the out-of-stop range signal is continuously output for at least a predetermined period of time. The drive circuit drives the motor in a direction indicated by the rotating direction indication signal while the drive permission signal is continuously output, so that an instantaneous ON/OFF signal is not input to the drive circuit in the presence of external noise.

19 Claims, 12 Drawing Sheets

POSITIONING APPARATUS

BACKGROUND OF THE INVENTION

1. Field of the Invention

The present invention relates to a positioning apparatus for performing feedback control to a motor to stop a control object at a target position.

2. Description of the Related Art

Conventionally, when control of a blow-out port of an automobile air conditioning system is to be performed, i.e., when a control object such as a lever rotated about one point is to be rotated to a target position, an apparatus which gives the target position by a digital value or an analog value to move the control object by a motor to the target position is generally used.

As the conventional positioning apparatus, an apparatus shown in FIG. 1 is known. This positioning apparatus comprises a motor 5 and a PBR (Potentio Balance Resistor) 6 for detecting the present position of the control object to output a present position signal d as a voltage value.

The positioning apparatus further comprises a stop range setting circuit 1 for setting the upper and lower limit values of a stop range having a predetermined width with the target position of a target position signal a input as a digital or an analog value in the center, a comparison circuit 2 for comparing an output from the stop range setting circuit 1 with an output frown the PBR 6, and a drive circuit 4 for performing forward rotation, reverse rotation, and stop of the motor 5 on the basis an output from the comparison circuit 2.

The comparison circuit 2 is constituted by two comparators 21 and 22 using two outputs b and c from the stop range setting circuit I as determination levels, respectively, and a NAND gate 23. When the comparison circuit 2 determines that the control object is out of the stop range, the comparison circuit 2 outputs a out-of-stop range signal e (H(high) output from the NAND gate 23) for permitting the motor 5 to be rotated, and a rotating direction indication signal f for indicating a rotating direction of the motor 5.

The drive circuit 4 rotates the motor 5 in the direction indicated by the rotating direction indication signal f while the out-of-stop range signal e is output from the comparison circuit 2. When the control object reaches a target position being within the stop range by rotation of the motor 5, an output from the PBR 6 has a voltage value set between an upper limit value b and a lower limit value a. For this reason, the out-of-stop range signal a from the comparison circuit 2 is eliminated (output from the NAND gate 23 goes to L(low)), and the drive circuit 4 stops rotation of the motor 5.

With the above operation, the control object is to be stopped within a range having a predetermined width with the target position in the center.

There is a time-lag between determination of drive stop by the comparison circuit 2 after the control object has been set within the stop range and actual stop of the motor 5, and the control object overruns. For this reason, the stop range is set to be larger than an overrunning amount to prevent hunching.

However, in the above conventional positioning apparatus, when the control object is located at a position near the stop range, as shown in FIG. 2, if external noise such as clock noise from a digital circuit is mixed with an output from the PBR 6 indicating the present position, crossing between the line of the upper limit value b or the lower limit value a and the present position signal d is instantaneously repeated. As a result, chattering w is disadvantageously generated by the out-of-stop range signal e from the comparison circuit 2.

When the chattering w is generated by the out-of-stop range signal e, a driver for driving the motor 5 instantaneously repeats an ON/OFF operation within a short time in which the motor 5 cannot be completely rotated. For this reason, the positioning apparatus itself may generate noise. The noise generated by the positioning apparatus does not only adversely affects other peripheral equipment but also enhances chattering of the out-of-stop range signal and amplifies the noise. That is, the positioning apparatus may be placed in a vicious cycle.

As a countermeasure against these phenomena, two conventional countermeasure are generally considered. One countermeasure is a method of setting a hysteresis. That is, after the control object has been set within the stop range once, the width of the stop range is increased to increase the distance between the present position of the control object and the boundary of the stop range.

However, in this case, a range in which the stop position of the control object can be assured is obtained by adding the hysteresis to the stop range, and stop precision is degraded.

The other countermeasure is a method of removing noise. That is, a low-pass filter is inserted into the output or out-of-stop range signal a from the PBR 6.

However, in this case, a time-lag between when the control object is set within the stop range and when the motor 5 is actually stopped increases, and an overrunning amount may increase to generate hunching.

SUMMARY OF THE INVENTION

The present invention, therefore,, has been made in consideration of the conventional problems and has as its object to provide a positioning apparatus which is prevented from being adversely affected by external noise without degrading stop precision and generating hunching.

According to the first aspect of the present invention, there is provided a positioning apparatus comprising a motor for changing a position of a control object, position detection circuit configured to detect a present position of the control object, a stop range setting circuit configured to determine a stop range of the control object, a comparator circuit configured to compare an output from the position detection circuit with an output from the stop range setting circuit to output a out-of-stop range signal and a drive direction indication signal for indicating a drive direction of the motor when the control object is out of the stop range, a drive start determination circuit configured to output a drive permission signal when the out-of-stop signal is continuously output for at least a first predetermined period of time, and then to stop an outputting operation of the drive permission signal on the basis of no output of the out-of-stop range signal, and a drive circuit configured to drive the motor in a direction indicated by the drive direction indication signal while the drive permission signal is output.

According to the first aspect of the present invention, the stop range setting circuit sets a stop range of a control object on the basis a commanded target position, and the position detection circuit detects a present position of the control object driven by the motor. The comparator circuit compares the detected present position of the control object with the set stop range, and outputs the out-of-stop range signal and the drive direction indication signal when the control object is out of the stop range. The out-of-stop range signal is input to the drive start determination circuit, and the drive permission signal is output to the drive circuit when the out-of-stop range signal is continuously output for at least the predetermined period of time. The drive circuit drives the motor in the direction indicated by the drive direction indication signal from the comparator circuit while the drive permission signal is output.

In this manner, the drive circuit is prevented from instantaneously repeating an ON/OFF operation even in the presence of external noise, and the control object is prevented from being out of the stop range due to noise.

According to the second aspect of the present invention, in place of the drive start determination circuit, a drive continuing circuit configured to continue an outputting operation of a drive permission signal for a predetermined period of time from when the out-of-stop range signal is output, and to stop the outputting operation of the drive permission signal on the basis of no output of the out-of-stop range signal after the predetermined period of time.

According to the second aspect of the present invention, the drive continuing circuit outputs the drive permission signal to the drive circuit as soon as the drive continuing circuit receives the out-of-stop range signal. The drive continuing circuit continues an outputting operation of the drive permission signal for at least the predetermined period of time after the drive permission signal has been output regardless of a continuous time of the out-of-stop range signal. After the second predetermined period of time has elapsed, the outputting operation of the drive permission signal is stopped when the outputting operation of the out-of-stop range signal is stopped.

In this manners the drive circuit is prevented from instantaneously repeating an ON/OFF operation even in the presence of external noise, and the control object can be rapidly and certainly set within the stop range without obstructing of the driving of the control object due to noise after the driving has been started on the basis of the out-of-stop range signal.

According to the third aspect of the present invention, there is provided a positioning apparatus comprising a motor for changing a position of a control object, a position detection circuit configured to detect a present position of the control object, a stop range setting circuit configured to determine a stop range of the control object, a comparator circuit configured to compare an output from the position detection circuit with an output from the stop range setting circuit to output a out-of-stop range signal and a drive direction indication signal for indicating a drive direction of the motor when the control object is out of the stop range, a drive condition determination circuit configured to output a drive permission signal when the out-of-stop signal is continuously output for a first predetermined period of time, continuing an outputting operation of the drive permission signal for a second predetermined period of time from output start of the drive permission signal, and to stop the outputting operation of the drive permission signal on the basis of no output of the out-of-stop range signal after the second predetermined period of time, and a drive circuit configured to drive the motor in a direction indicated by the drive direction indication signal while the drive permission signal is output.

According to the third aspect of the present invention, the drive condition determination circuit outputs the drive permission signal to the drive circuit when the out-of-stop range signal is continuously output for the first predetermined period of time. The outputting operation of the drive permission signal continues for the second predetermined period of time after the outputting operation of the drive permission signal is started. After the second predetermined period of time has elapsed, the outputting operation of the drive permission signal is stopped when the outputting operation of the out-of-stop range signal is stopped.

In this manner, driving is not easily started by external noise. In addition, after driving has been started on the basis of the out-of-stop range signal, the driving is prevented from being obstructed.

The drive condition determination circuit can comprises a drive start determination circuit configured to output a drive start signal when the out-of-stop signal is continuously output for at least the first predetermined period of time, and a drive continuing circuit configured to continue an outputting operation of a drive permission signal for the second predetermined period of time from when the drive start signal is output, and to stop the outputting operation of the drive permission signal on the basis of no output of the out-of-stop range signal after the second predetermined period of time.

In this case, the drive start determination circuit can comprises a plurality of flip-flops or latch circuits which are connected In series with each other and reset when the out-of-stop range signal is not output, or may also comprises a time constant circuit having a capacitor, a charge/short-circuiting circuit configured to set the capacitor in a charge state when the out-of-stop range signal is output, and to short-circuit the capacitor when the out-of-stop range signal is not output, and a voltage detection circuit configured to output the drive permission signal or the drive start signal when a terminal voltage of the capacitor is not lower than a predetermined value.

The drive continuing circuit can comprises a holding circuit, which has a set input which is given a priority and a reset input, the holding circuit receiving the out-of-stop range signal or the drive start signal as a set signal and outputting the drive permission signal, a time constant circuit having a capacitor, a charge/short-circuiting circuit configured to sot the capacitor in a charge state when the out-of-stop range signal is output, and to short-circuit the capacitor when the out-of-stop range signal is not output, and a voltage detection circuit configured to reset the holding circuit when a terminal voltage of the capacitor is not lower than a predetermined value.

The drive condition determination circuit can also comprises a first holding circuit, which has a set input and a reset input which is given a priority, the first holding circuit receiving a reset signal when the out-of-stop range signal is not output, a second holding circuit, which has a set input which is given a priority and a reset input, the second holding circuit receiving an output from the first holding circuit as a set signal and outputting the drive permission signal, a time constant circuit having a capacitor, a charge/short-circuiting circuit configured to set the capacitor in a charge state when at least one of the out-of-stop range signal and the drive permission signal is output, and to short-circuit the capacitor when both of the out-of-stop range signal and the drive permission signal are not output, a first voltage detection circuit configured to set the first holding circuit when a terminal voltage of the capacitor is not lower than a first predetermined value, and a second voltage detection circuit configured to output a reset signal to the second holding circuit when the terminal voltage is not lower than a second predetermined value.

The nature, principle and utility of the invention will become more apparent from the following detailed description when read in conjunction with the accompanying drawings.

DETAILED DESCRIPTION OF THE PREFERRED EMBODIMENTS

Embodiments of the present invention will be described below.

Figure 3:
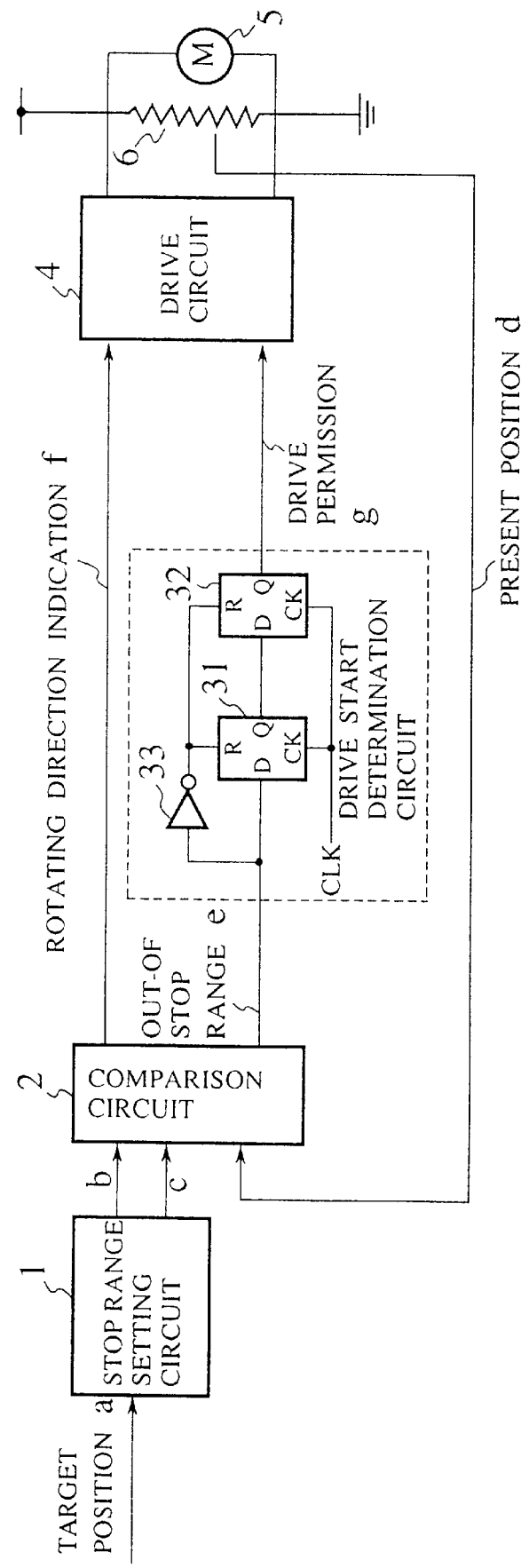
FIG. 3 is a block diagram showing the arrangement of the first embodiment of the present invention.

FIG. 3 is a block diagram showing the arrangement of the first embodiment of the present invention.

A motor 5 for moving a control object (not shown) is arranged, and a PBR 6 serving as a position detection circuit detects a present position of the control object moved by the motor 5, and outputs a present position signal d to a comparison circuit 2 as a voltage value.

A stop range setting circuit 1 sets the upper and lower limit values of a stop range of the control object having a width predetermined with a target position of an input target position signal a in the center, and outputs an upper limit value signal b and a lower limit value signal C as voltage values to the comparison circuit 2 serving as a comparator circuit.

Figure 1:
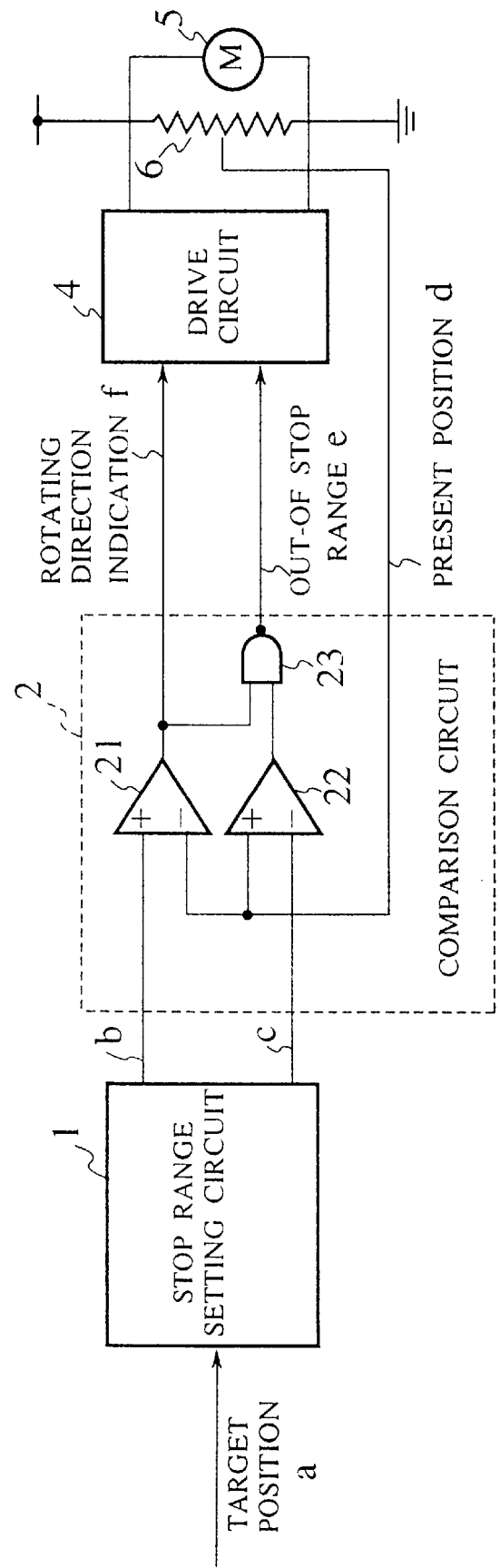
FIG. 1 is a block diagram showing a prior art.
Figure 2:
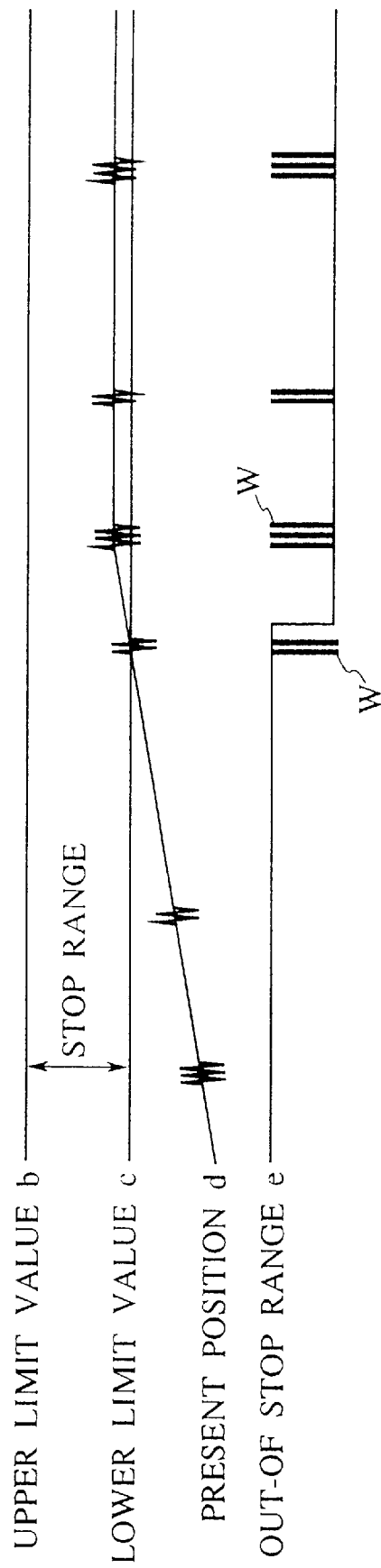
FIG. 2 is a view for explaining an influence of noise on a drive circuit.

The comparison circuit 2 has the same arrangement as that of the comparison circuit shown in FIG. 1. and compares the upper limit value signal b and the lower limit value signal c from the stop range setting circuit 1 with the present position signal d from the PBR 6. When the comparison circuit 2 determines that the control object is not within the range of the upper and lower limit values and out of the stop range, the comparison circuit 2 outputs a out-of-stop range signal e which goes to H, and a rotating direction indication signal f serving as a drive direction indication signal.

A drive start determination circuit 3 is arranged between the comparison circuit 2 and a drive circuit 4 for driving the motor 5.

The rotating direction indication signal f is input to the drive circuit 4, and the out-of-stop range signal e is input to the drive start determination circuit 3.

The drive start determination circuit 3 is constituted by a first flip-flop 31 and a second flip-flop 32 which are connected in series with each other, and an inverter 33. The out-of-stop range signal a from the comparison circuit 2 is input to an input terminal D of the first flip-flop 31, and an output from the first flip-flop 31 serves as an input signal of the second flip-flop 32. The out-of-stop range signal e is inverted by the inverter 33, and the inverted signal is input to reset terminals R of the first and second flip-flops 31 and 32.

In the drive start determination circuit 3, the out-of-stop range signal a is sampled by the first flip-flop 31 using a clock CLK, and an output from the second flip-flop 32 of the final stage is output to the drive circuit 4 as a drive permission signal g.

Forward rotation, reverse rotation, and stop of the motor 5 are performed by the drive circuit 4 on the basis of the drive permission signal g from the drive start determination circuit 3 and the rotating direction indication signal f from the comparison circuit 2.

An operation in the drive start determination circuit 3 will be described below with reference to the timing chart in FIG. 4.

Figure 4:
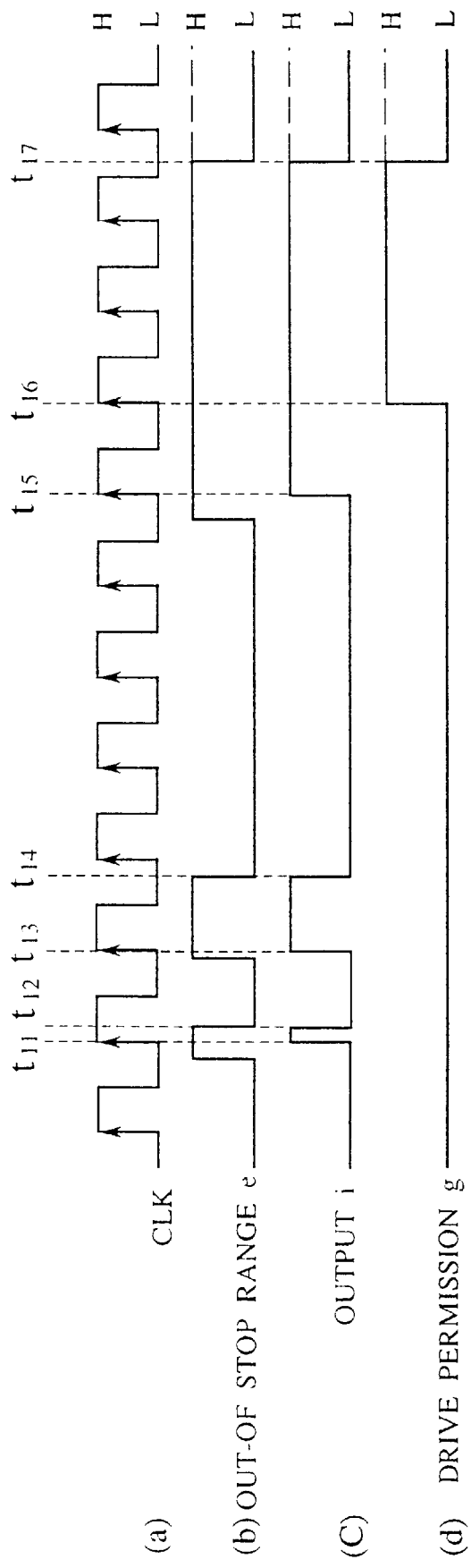
FIG. 4 is a timing chart showing an operation of a drive start determination circuit in the first embodiment.

When the out-of-stop range signal e, shown in (b), output from the comparison circuit 2 is at H level, and a clock CLK shown in (a) rises, as shown in (c), an output signal i from the first flip-flop (F/F) 31 goes to R (times t11, t13, and t05 in FIG. 4). The output signal i from the first flip-flop 31 is sampled by the second flip-flop 32.

When the control object is actually out of the stop range, the cloak CLK is input twice or more times while the out-of-stop range signal a is at H level (t15 and t16). When a cloak is input at time t15, the first flip-flop 31 samples the out-of-stop range signal e. When the next clock is input at t16, the output i from the first flip-flop 31 is sampled by the second flip-flop 32, and the drive permission signal g goes to H as shown in (d).

When the drive circuit 4 receives the drive permission signal g at t16, the drive circuit 4 rotates the motor 5 in a rotating direction indicated by the rotating direction indication signal f.

When the control object is set within the stop range with rotation of the motor 5, the Out-of-stop range signal e goes to L. For this reason, the first and second flip-flops 31 and 32 are reset, and, immediately, the drive permission signal g goes to L. The drive circuit 4 stops the rotation of the motor 5 to stop the control object within the stop range.

On the other hand, as at times t12 and t14, when the out-of-stop range signal a goes to L before the next clock is input, the first flip-flop 31 and the second flip-flop 32 are reset. More specifically, if the out-of-stop range signal e does not keep H level for two or more clocks, an output from the second flip-flop 32, i.e., the drive permission signal g shown in (d), does not go to H.

For this reason, if the out-of-stop range signal e is output due to external noise, the out-of-stop range signal e does not continue. For this reason, the drive permission signal g is not output, the drive circuit for driving the motor 5 is prevented from instantaneously repeating an ON/OFF operation due to external noise.

As described above, according to this embodiment, only when the out-of-stop range signal e is continuously output while a clock is input into the first and second flip-flops 31 and 32 twice or more times, the motor 5 is driven. For this reason, the drive circuit can be prevented from instantaneously repeating an ON/OFF operation due to external noise.

When the control object is close to a boundary within the stop range, even if noise which raises the out-of-stop range signal is inserted into an output from the PBR, the drive circuit is not influenced by the noise. Since the control object does not move unless the out-of-stop range signal is continuously output, the control object does not go out of the atop range.

Since the stop range need not be extended, stop precision is not degraded, and no hunching occurs. There is no probability of generating a foreign sound caused by repetitive fine movement of the control object within the stop range.

When the number of connection stages of the flop-flops is further increased, a predetermined period of time in which the out-of-stop range signal must be continuously output can be arbitrarily set.

Although a plurality of flip-flops are used in the drive start determination circuit 3 in the above description, a latch circuit may be used in place of the plurality of flip-flops.

Figure 5:
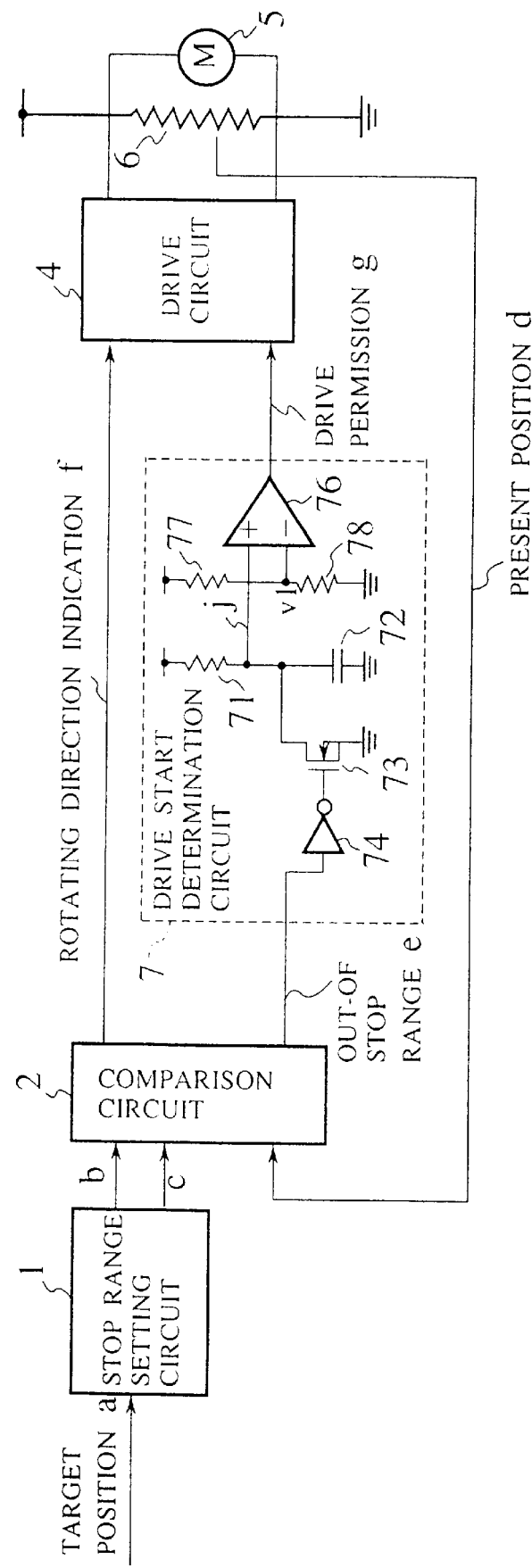
FIG. 5 is a block diagram showing the arrangement of the second embodiment of the present invention.

FIG. 5 is a block diagram showing the arrangement of the second embodiment of the present invention. In this embodiment, a drive start determination circuit 7 constituted by an analog circuit is used in place of the drive start determination circuit 3 constituted by a digital circuit in the first embodiment.

The drive start determination circuit 7 comprises a time constant circuit constituted by a resistor 71 and a capacitor 72; a charge/short-circuiting circuit constituted by a transistor 73 connected to the connection point between the resistor 71 and the capacitor 72 and an inverter 74 for inverting an out-of-stop range signal to input the inverted signal to the gate of the transistor 73; and a comparator 76.

A charge/short-circuiting circuit charges the capacitor 72 when an out-of-stop range signal e is at H level, and short-circuits the capacitor 72 when the out-of-stop range signal e is at L.

The comparator 76 compares a reference voltage v1 calculated by a partial voltage ratio of resistors 77 and 78 with a terminal voltage j of the capacitor 72. When the latter is higher than the former, the comparator 76 outputs a dr4&ve permission signal g (=H).

The arrangement of the second embodiment is the sane as that of the first embodiment shown in FIG. 3 except for the drive start determination circuit 7.

Figure 6:
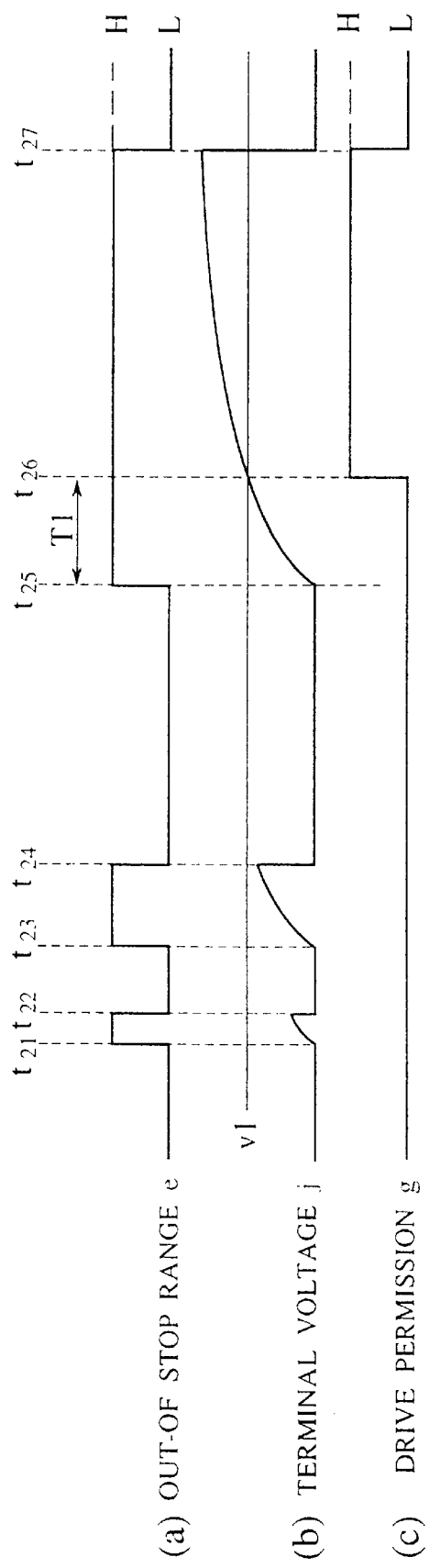
FIG. 6 is a timing chart showing an operation of a drive start determination circuit in the second embodiment.

An operation in the drive start determination circuit 7 will be described below with reference to the timing chart in FIG. 6.

When the out-of-stop range signal e, shown in (a), output from the comparison circuit 2 changes from L to H, the out-of-stop range signal e is inverted and then applied to the transistor 73. For this reason, the transistor 73 is turned off, charging of the capacitor 72 is started as shown in (b) (times t21, t23, and t25). The terminal voltage j of the capacitor 72 increases with time.

When the control object is actually out of the stop range, the out-of-stop range signal e is kept at H level for at least a period of time T (=t25–t26) from when the charging of the capacitor 72 is started to when the terminal voltage j reaches the reference voltage v1. In this manner, the drive permission signal g is output, and the drive circuit 4 rotates the motor 5 in a rotating direction indicated by the rotating direction indication signal f.

When the control object is set within the stop range with rotation of the motor 5, the out-of-stop range signal e goes to L. For this reason, the transistor 73 is turned on, the out-of-stop range signal e is eliminated (=L), and the drive circuit 4 stops the rotation of the motor 5 (t27). At this time, the transistor 73 is set in an ON state, and the terminal voltage j of the capacitor 72 returns to 0 volt.

As at times t22 and t24, the out-of-stop range signal e goes to L before the terminal voltage j reaches the reference voltage v1, the transistor 73 is turned on. and the terminal voltage j of the capacitor 72 becomes almost 0 volt by short-circuiting. For this reason, the drive permission signal g is riot output. More specifically, if the out-of-stop range signal e does not keep H level in the period of time T1 from when the charging of the capacitor 72 is started to when the terminal voltage j reaches the reference voltage v1, the drive permission signal g is not output. In other words, if an input signal serving as the out-of-stop range signal to the drive start determination circuit 7 is generated by external noise, the out-of-stop range signal a is not continuously output, whereby the drive permission signal is not output. Therefore, the drive circuit can be prevented from instantaneously repeating an ON/OFF operation due to external noise.

As described above, according to this embodiment, only when the out-of-stop range signal e is continuously output for at least a predetermined period of time, i.e., at least the period of time from when the charging of the capacitor 72 is stated to when the terminal voltage of the capacitor 72 reaches the reference voltage, the motor 5 is driven. The same effect as described in the previous embodiment can be obtained without degrading stop precision and generating hunching.

Figure 7:
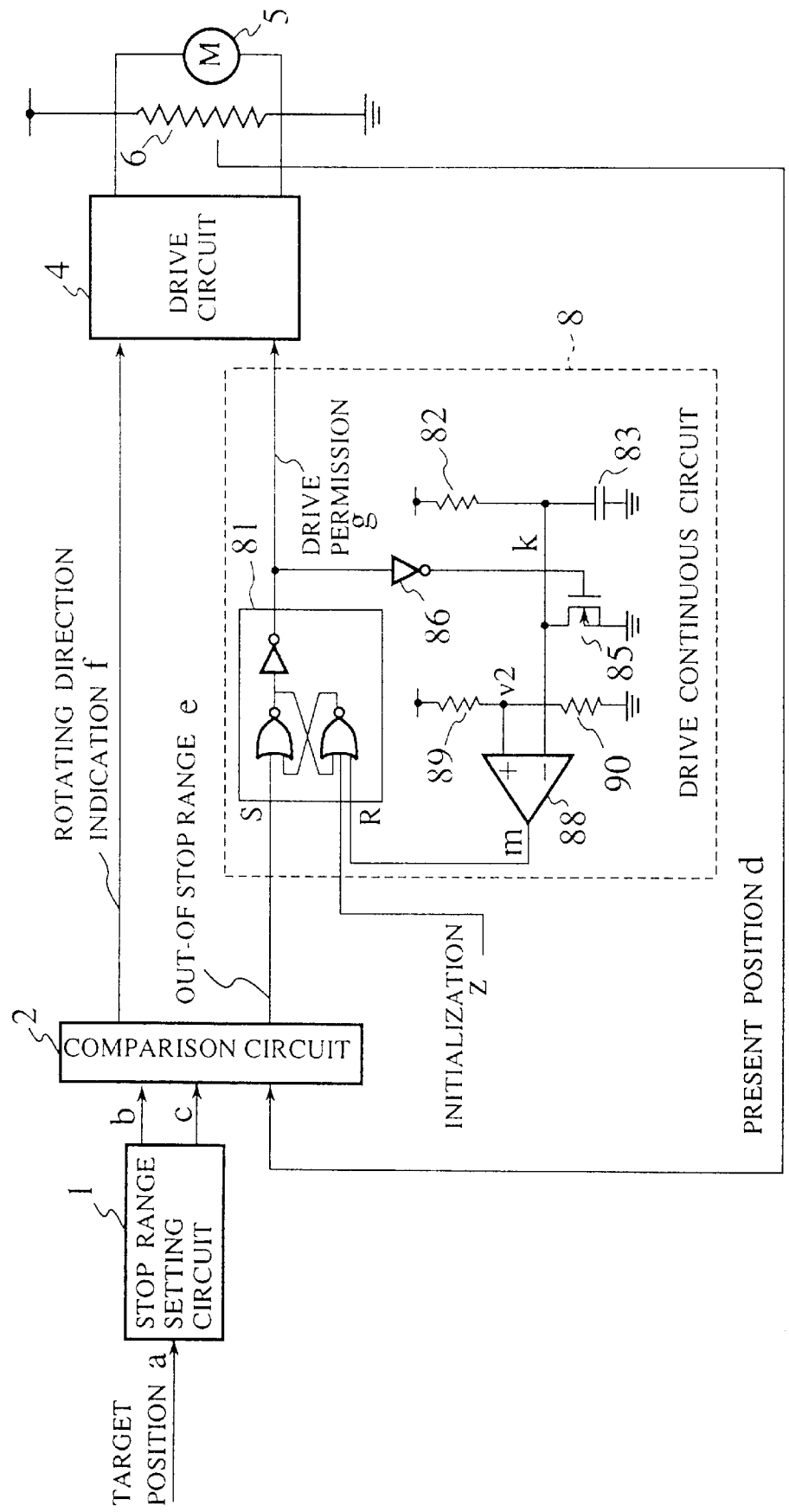
FIG. 7 is a block diagram showing the arrangement of the third embodiment of the present invention.

FIG. 7 is a block diagram showing the arrangement of the third embodiment of the present invention. In this embodiment, a drive continuing circuit is arranged between a comparison circuit and a drive circuit in place of the drive start determination circuit in the first embodiment.

A drive continuing circuit 8 comprises a latch circuit 81 which has a set input terminal S which is given a priority and a reset input terminal R, and a time constant circuit constituted by a resistor 82 and a capacitor 83. The drive continuing circuit 8 further comprises a charge/short-circuiting circuit constituted by a transistor 85 connected to the connection point between the resistor 82 and the capacitor 83 and an inverter 86 for inverting an output from the latch circuit 81 to input the inverted output to the gate of the transistor 85; and a comparator 88 for comparing a terminal voltage k of the capacitor 83 with a reference voltage v2 calculated by a partial voltage ratio of resistors 89 and 90 to output H when the capacitor terminal voltage k to higher than the reference voltage v2.

A out-of-stop range signal a from the comparison circuit 2 is input to the set input terminal S of the latch circuit 81, and an output m from the comparator 88 is input to the reset terminals R. When a power supply is turned on, an initializing signal z of 1 pulse is input, and the initial state of an output from the latch circuit 81 is set at L level.

The output from the latch circuit 81 is input to the drive circuit 4 as a drive permission signal g.

The arrangement of this embodiment is the same as that of the first embodiment shown in FIG. 3 except for the drive continuing circuit 8.

Figure 8:
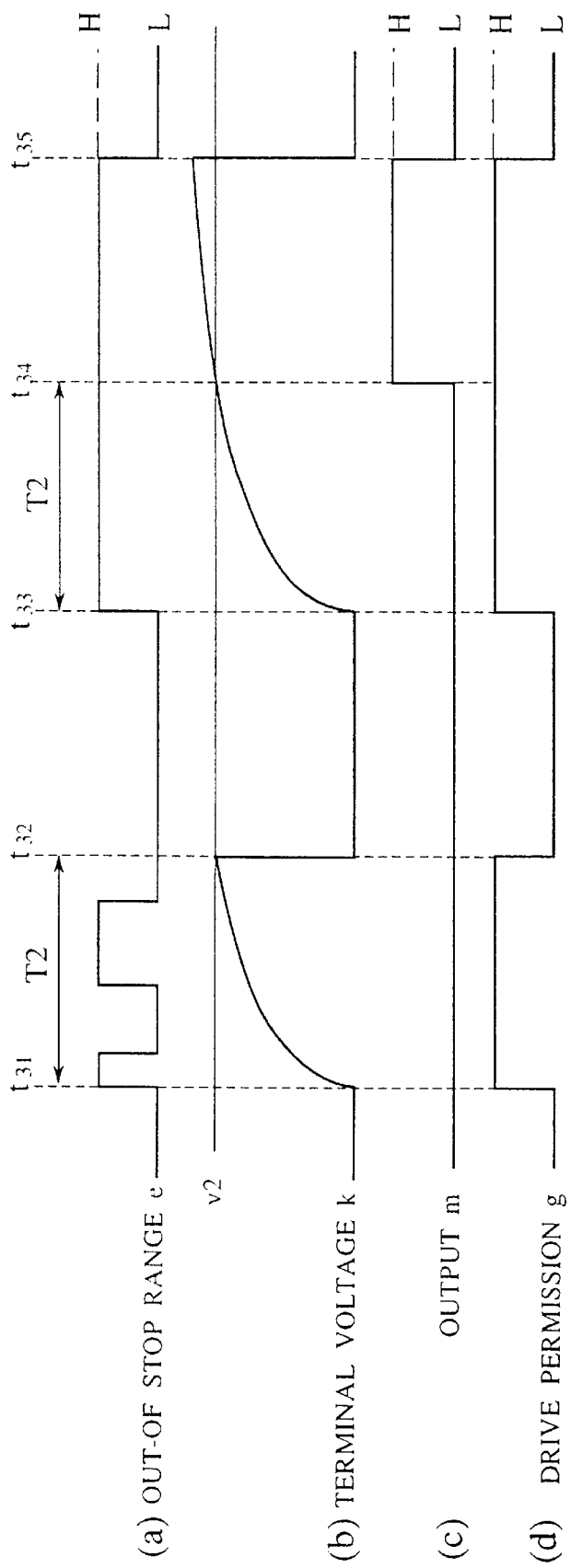
FIG. 8 is a timing chart showing an operation of a drive continuing circuit in the third embodiment.

An operation cf the drive continuing circuit 8 will be described below with reference to the timing chart in FIG. 8.

Since an output from the latch circuit 81 is at L level in an initial state, the transistor 85 is in an ON state. Therefore, the terminal voltage k of the capacitor 83 is 0 volt, and the output signal a from the comparator 88 is at L level.

When the out-of-stop range signal e, shown in (a), output from the comparison circuit 2 goes to H, the output from the latch circuit 81, i.e., the drive permission signal g shown in (d), goes to H. The drive circuit 4 which receives the drive permission signal g rotates the motor in a direction indicated by the rotating direction indication signal f (times t31 and t33).

At this time, since the output from the latch circuit 81 is inverted by the inverter 86 and applied to the transistor 65, the transistor 85 is turned off. In this manner, charging of the capacitor 83 is started, the terminal voltage k of the capacitor 83 increases with time as shown in (b). When the terminal voltage k of the capacitor 83 reaches the reference voltage v2, the output signal m from the comparator 88 goes to H as at times t32 and t34 in (o), and the output signal m is input to the reset terminal R of the latch circuit 81.

In this manner, the drive permission signal g in (d) necessarily keeps H level at least from rising of the out-of-stop range signal to rising of the output m of the comparator 88, that is, for a predetermined period of time determined by an output from the time constant circuit constituted by the resistor 82 and the capacitor 83 and the reference voltage v2. In this case, a predetermined period of time T2 is set to be a period of time which is long enough to start the motor 5 and in which a displacement of the control object with respect to the stop range is sufficiently small.

Therefore, when the motor 5 is started once, the motor 5 must be continuously driven in the period of time T2 regardless of the state of the out-of-stop range signal e.

Thereafter, when the output from the comparator 88 goes to H, if the out-of-stop range signal e has been set at L level as at time t32, the drive permission signal g is eliminated (=L), and the drive circuit 4 stops rotation of the motor 5.

The latch circuit 81 is designed in such a way that the set input terminal is given a priority. For this reason, when the out-of-stop range signal a is at H level, even if the signal output from the comparator 88 and serving as a reset signal is at H level, the drive permission signal 9 does not go to L so long as the out-of-stop range signal e is at H level. When the out-of-stop range signal e falls later (time t35), the drive permission signal g goes to L, and the drive circuit 4 stops rotation of the motor 5.

As described above, according to this embodiment, when the motor 5 is driven once, the motor 5 must be continuously driven at least in the predetermined period of time T2 by the drive continuing circuit 8 regardless of the out-of-stop range signal e. Therefore, the drive circuit can be prevented from instantaneously repeating an ON/OFF operation due to external noise.

Therefore, when the control object is close to a boundary outside of the stop range, even if noise which drops the out-of-stop range signal is inserted into an output from the PBR after the drive circuit is turned on on the basis of the out-of-stop range signal, the motor is necessarily rotated within a predetermined period of time without receiving the influence of the noise. For this reason, the control object can be rapidly and certainly set within the stop range.

The predetermined period of time T2 serving as the minimum drive time is set to be a period of time which is long enough to start the motor and in which a displacement of the control object with respect to the stop range is sufficiently small. For this reason, when the control object is within the stop range, even if noise is inserted into the output from the PBR 6 to raise the out-of-stop range signal e and start rotation of the motor 5, there is no chance that the control object unexpectedly go out of the stop range.

When a counter constituted by a digital circuit Is used in place of the analog time constant circuit, the same function can be realized. However, time setting by the analog circuit has the following advantage. That is, the motor can be certainly stopped even if supply of an external clock is stopped by a malfunction.

Figure 9:
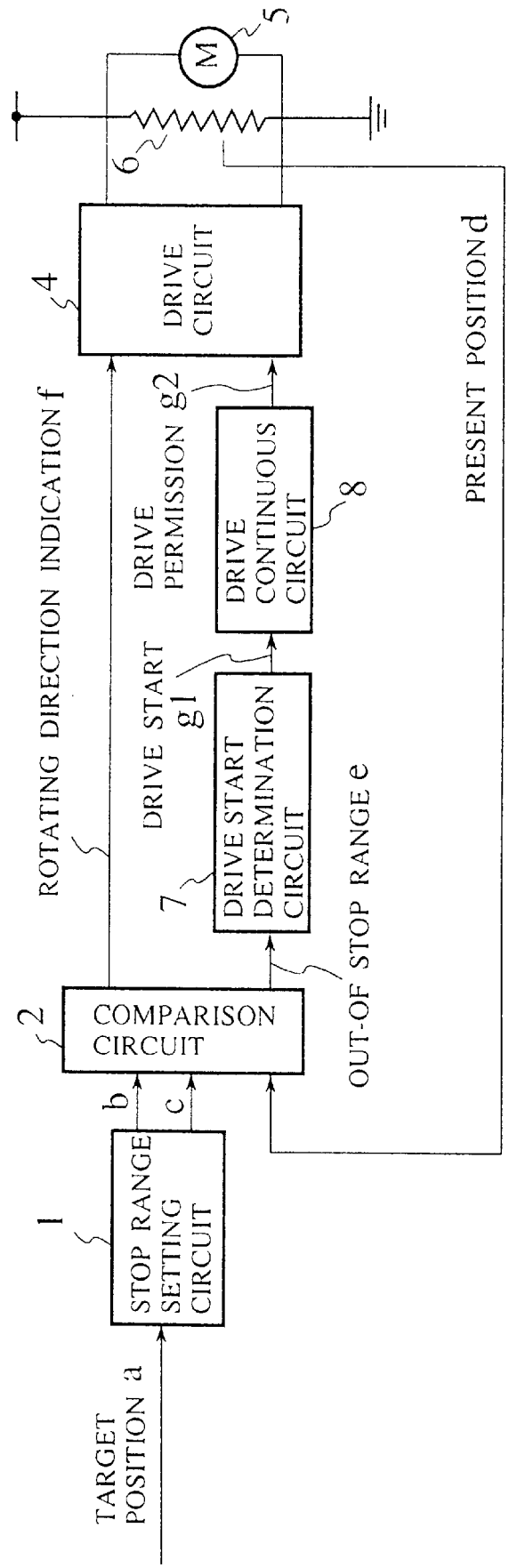
FIG. 9 is a block diagram showing the arrangement of the fourth embodiment or the present invention.

FIG. 9 is a block diagram showing the arrangement of the fourth embodiment of tae present invention.

In this embodiment, the drive start determination circuit used in the second embodiment and the drive continuing circuit used in the third embodiment are arranged between a comparison circuit and a drive circuit.

A drive start determination circuit 7 receives a out-of-stop range signal a from a comparison circuit 2 da an input to output a drive start signal g1 from a comparator 76 (see FIG. 5). A drive continuing circuit 8 inputs the drive start signal g1 from the drive start determination circuit 7 to a set input terminal S of a latch circuit 81 (see FIG. 7), and outputs an output from the latch circuit 81 to a drive circuit 4 as a drive permission signal g2.

The remaining arrangement of this embodiment is the same as the arrangement of the first embodiment.

When the drive start determination circuit 7 determines that the out-of-stop range signal a is continuously output for at least a predetermined period of time, the drive start determination circuit 7 outputs the drive start signal g1 to the drive continuing circuit 8. When the drive continuing circuit 8 receives the drive start signal 91, the drive continuing circuit 8 outputs the drive permission signal g2 to the drive circuit 4, and the drive circuit starts driving of the motor 5.

Once the drive permission signal g2 is output, the motor is continuously driven for at least a predetermined minimum drive time regardless of the state of the drive start signal g1.

Figure 10:
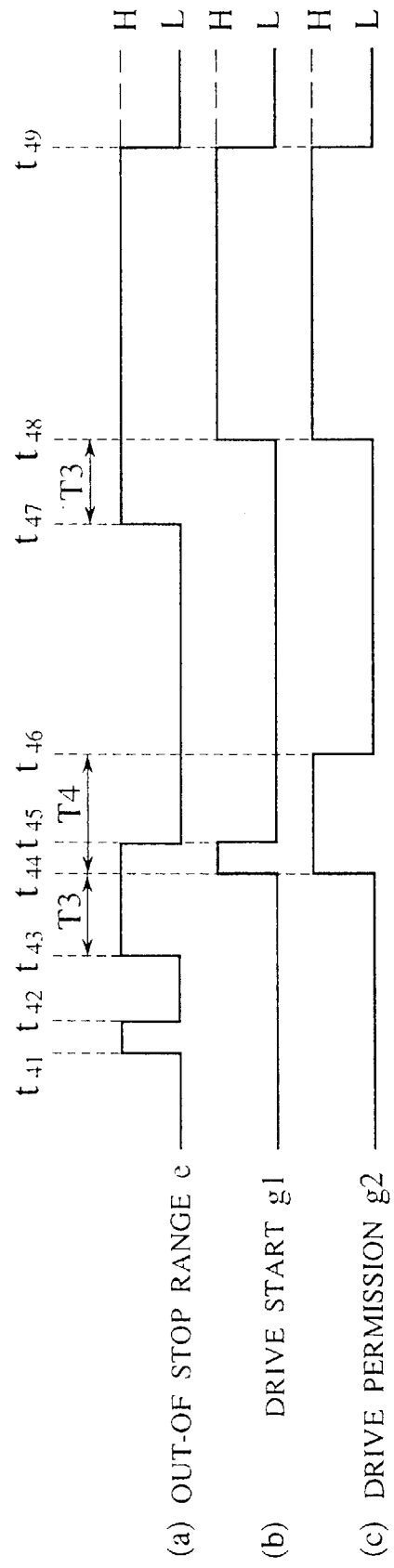
FIG. 10 is a timing chart showing operations of a drive start circuit and a drive continuing circuit in the fourth embodiment.

Operations in the drive start determination circuit 7 and the drive continuing circuit 8 will be described below with reference to the timing chart in FIG. 10.

As shown in (a), it is assumed that the out-of-stop range signal e from the comparison circuit 2 is input to the drive start determination circuit 7 (times t41, t43, and t47)

When the out-of-stop range signal e keeps H level for at least a predetermined period of tile T3 as at t43 to t45, the drive start signal g1 goes to H as shown in (b) (times t44 and t48).

As described in the second embodiment, in the drive start determination circuit 7, when the out-of-stop range signal e goes to H, if the out-of-stop range signal a does not keep H level for at least the predetermined period of time T3, the drive start signal g1 does not go to H (t42).

As shown in (c), the drive continuing circuit 8 outputs the drive permission signal g2 in response to U level of the drive start signal g1.

Once the drive permission signal g2 goes to H, as described in the third embodiment, the drive permission signal g2 keeps H level for at least a predetermined minimum drive time T4 as at times t44 to t46 regardless of the state of the drive start signal g1. After the minimum drive time T4 has elapsed, when the drive start signal g1 goes to L, the outputting operation of the drive permission signal g2 is stopped (time t49).

In this embodiment, a drive condition determination circuit is constituted by the drive start determination circuit 7 and the drive continuing circuit 8.

As described above, according to this embodiment, driving of the motor is started only when the out-of-stop range signal e output from the comparison circuit keeps H level for at least the predetermined period of time T3. Then, once the driving is started, the motor is continuously driven for the predetermined period of time T4 without any conditions. Thereafter, when the control object is located within the stop range to set the out-of-stop range signal at L level, outputting of a drive permission signal is stopped.

Therefore, when the control object is close to a boundary outside the stop range, even if noise which drops the out-of-stop range signal is inserted into an output from the PBR after the drive circuit is turned on on the basis of the out-of-stop range signal, the motor is necessarily rotated within a predetermined period of time without receiving the influence of the noise. For this reason, the control object can be rapidly and certainly set within the stop range.

On the other hand, when the control object is close to a boundary within the stop range, even if noise which raises the out-of-stop range signal is inserted into an output from the PBR, the motor is free from the influence of the noise, and the control object does not move unless the out-of-stop range signal is continuously output for a predetermined period of time. For this reason, the control object does not go out of the stop range. There is no probability of generating a foreign sound caused by repetitive fine movement of the control object within the stop range.

Figure 11:
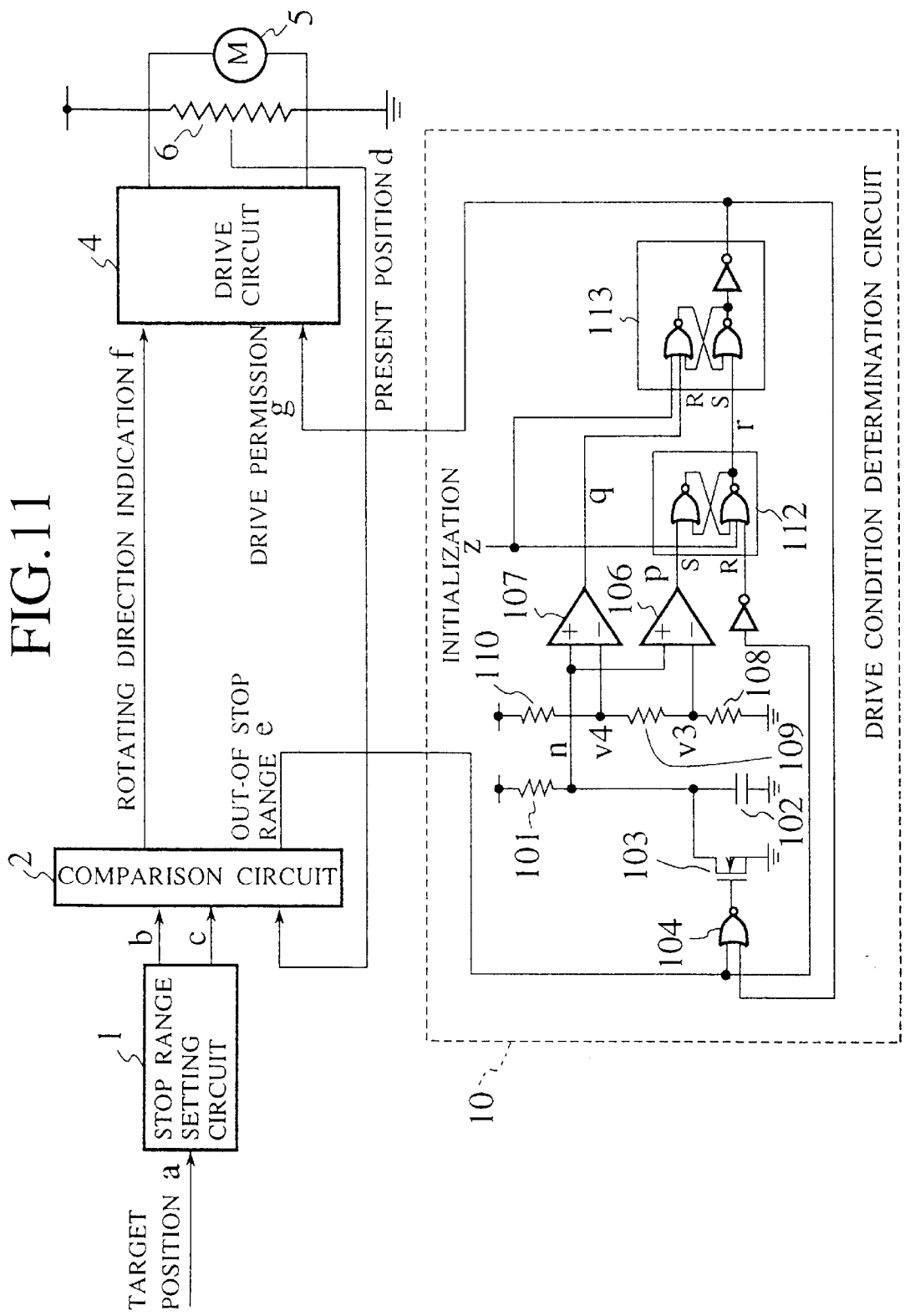
FIG. 11 is a block diagram showing the arrangement of the fifth embodiment of the present invention.

FIG. 11 is a block diagram showing the arrangement of the fifth embodiment of the present invention.

In this embodiment, in place of the drive start circuit and the drive continuing circuit in the fourth embodiment, a drive condition determination circuit which integrally performs the functions of these circuits is arranged.

A drive condition determination circuit 10 receives an out-of-stop range signal a from a comparison circuit 2 and outputs a drive permission signal g to a drive circuit 4.

The drive condit4-on determination circuit 10 comprises a time constant circuit constituted by a resistor 101 and a capacitor 102, a charge/short-circuiting circuit constituted by a transistor 103 connected to the connection point between the resistor 101 and the capacitor 102 and a NOR gate 104 connected to the gate of the transistor 103; and first and second comparators 106 and 107 for comparing a terminal voltage n of the capacitor 102 with predetermined reference voltages v3 and v4 respectively.

The NOR gate 104 receives an out-of-stop range signal a and a drive permission signal g as inputs. When both the out-of-stop range signal e and the drive permission signal g are at L level, the NOR gate 104 turns on the transistor 103 to short-circuit the capacitor 102.

Resistors 108, 109, and 110 which are connected in series with each other are arranged to define the reference voltages of the first and second comparators 106 and 107, and a first reference voltage v3 and a second reference voltage v4 based on partial voltage ratios at respective connection points are input to the first and second comparators 106 and 107, respectively. The first reference voltage v3 and the second reference voltage v4 are set to satisfy a condition v3<v4.

The first comparator 106 outputs H when the terminal voltage n of the capacitor 102 is higher than the first reference voltage v3, and the second comparator 107 outputs H when the terminal voltage of the capacitor 102 is higher than the second reference voltage v4.

The drive condition determination circuit 10 further comprises a first latch circuit 112 connected to the first comparator 106 and a second latch circuit 113 connected to the second comparator 107.

The first latch circuit 112 is a reset priority circuit having an output p from the first comparator 106 as a set input and a signal obtained by inverting the out-of-stop range signal a by an inverter 114 as a reset input. The second latch circuit 113 is a set priority circuit having an output r from the first latch circuit 112 as a set input and an output q from the second comparator 107 as a reset input. An output from the second latch circuit 113 is used as the drive permission signal g.

An initializing signal of 1 pulse is input to the first and second latch circuits 112 and 113 when a power supply is turned on, so that the initial state of each output is set at L level.

The remaining arrangement is the same as that in the first embodiment.

Figure 12:
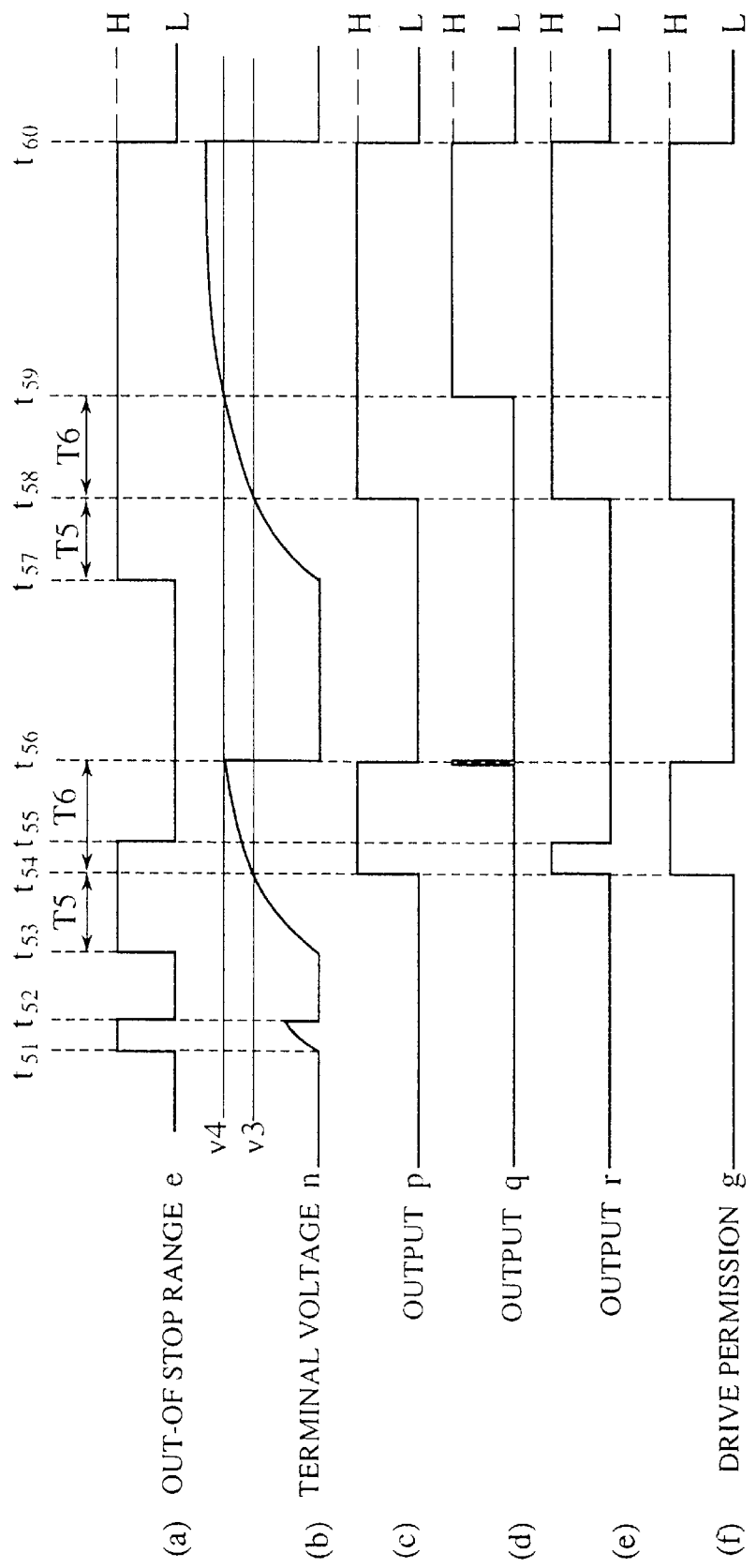
FIG. 12 is a timing chart showing an operation of a drive condition determination circuit in the fifth embodiment.

An operation in the drive condition determination circuit will be described below with reference to the timing chart In FIG. 12.

As shown in (a), it is assumed that the out-of-stop range signal e from the comparison circuit 2 is input. When the out-of-stop range signal e changes from L to H, the transistor 103 is turned off, and charging of the capacitor 102 is Started (times t51, t53, and t57).

As shown in (b), although the terminal voltage n of the capacitor 102 increases with time, when the out-of-stop range signal e goes to L (time t52) before the terminal voltage n reaches the first reference voltage v3, the transistor 103 is turned on, and the terminal voltage of the capacitor 102 becomes almost 0 volt. For this reason, the output p from the first comparator 106 shown in (c) does not go to H. More specifically, unless the out-of-stop range signal a keeps H level for at least a first predetermined period of time T5 from when charging of the capacitor 102 is started to when the terminal voltage reaches the first reference voltage v3, the output p from the first comparator 106 does not go to H.

As at times t53 to t35 and t57 to t60, the out-of-stop range signal e keeps H level, and the terminal voltage n of the capacitor 102 reaches the first reference voltage v3, the output p from the first comparator 106 goes to H, and the output r from the first latch circuit 112 shown in (e) is set at H level (times t54 and t58).

When the output r from the first latch circuit 112 goes to H, on output from the second latch circuit 113, i.e., the drive permission signal g shown in (f) is set at H level. The drive circuit 4 which receives the drive permission signal g drives the motor 5 in a direction indicated by a rotating direction indication signal f (t54 and t58).

When the out-of-stop range signal e goes to L before the terminal voltage n of the capacitor 102 reaches the second reference voltage v4 (times t55), the output r from the first latch circuit 112 is reset to L level. However, since the drive permission signal g keeps H level, the transistor 103 keeps an OFF state, and charging of the capacitor 102 is continued.

Thereafter, when the capacitor terminal voltage n reaches the second reference voltage v4, the output q from the second comparator 107 shown in (d) goes to H (time t56), and an output from the second latch circuit 113, i.e., the drive permission signal g, is set at L level.

In response to this, the drive circuit 4 stops driving of the motor 5. In addition, the transistor 103 is turned on, and the terminal voltage n of the capacitor 102 returns to almost 0 volt.

In this manner, the drive permission signal g necessarily keeps H level regardless of the state of the out-of-stop range signal e for a second predetermined period of time T6 from when the output p from the first comparator 106 rises to when the output q from the second comparator 107 rises.

Even if the terminal voltage n of the capacitor 102 exceeds the second reference voltage v4, when the out-of-stop range signal e keeps H level, the output q from the second comparator 107 goes to H at time (time t59) at which the capacitor terminal voltage n exceeds the second reference voltage v4, and a reset signal is input to the second latch circuit 113. However, the second latch circuit 113 has a set input terminal which is given a priority, and the output r from the first latch circuit 112 serving as a setting signal keeps H. For this reason, the drive permission signal g keeps H level.

Thereafter, when the control object is set within the stop range with rotation of the motor 5, and the out-of-stop range signal e goes to L (time t60), the output from the first latch circuit 112 is reset to L level. For this reason, the set signal of the second latch circuit l13 is canceled. The second larch circuit 113 is reset by the output q from the second comparator 107, and the drive permission signal g goes to L. The drive circuit 4 which receives the drive permission signal g stops driving of the motor 5. In addition, the transistor 103 is turned on, and the terminal voltage n of the capacitor 102 returns to almost 0 volt.

On the other hand, when the out-of-stop range signal e is output due to external noise, the out-of-stop range signal e is not continuously output for at least the predetermined period of time T5. For this reason, the output r from the first comparator 106 does not go to H due to an output generated by noise. Therefore, the drive permission signal g keeps L level.

As described above, according to this embodiment, the drive circuit can be prevented from instantaneously repeating an ON/OFF operation due to external noise, and the same effect as described in the previous embodiment can be obtained.

The present invention is not limited to a control apparatus in which a control object such as a lever is rotated about one point, and is also applied to positioning in a control apparatus for linearly displacing a control object.

As has described above, according to the present invention, in a positioning apparatus in which a present position of a control object is compared with a set stop range, an out-of-stop range signal is output while the control object does not reach the stop range, and a motor is driven by a drive circuit on the basis of the out-of stop range signal. a drive start determination circuit is arranged to output a drive permission signal to the drive circuit when the out-of-stop range signal is continuously output for a first predetermined period of time. For this reason, even if external noise is inserted into the present position signal or the like, the drive circuit does not instantaneously repeat an ON/OFF operation, or noise is not generated by repeating the ON/OFF operation. In addition, unlike a prior art, a set stop range need not be extended, and a filter is not required. For this reason, the positioning apparatus of the present invention is free from degradation of stop precision or an increase in overrunning amount.

A drive continuing circuit is arranged in place of the drive start determination circuit, and a drive permission signal is continuously output for at least a second predetermined period of time after the out-of-stop range signal has been output. In this case, the positioning apparatus is not influenced by external noise, and the motor is necessarily drive for a predetermined period of time after driving has been started on the basis of the out—of-stop range signal. For this reason, the control object can be rapidly and certainly set within the stop range without obstructing the driving of the rotor.

A drive condition determination circuit outputs a drive permission signal when the out-of-stop range signal is continuously output for at least the first predetermined period of time, and the drive permission signal is continuously output for at least the second predetermined period of time after outputting of the drive permission signal has been started. For this reason, even if external noise is inserted Into the present position signal or the like, the drive circuit does not instantaneously repeat an ON/OFF operation, or motor drive started on the basis of the out-of-stop range signal is prevented from being obstructed.

It should be understood that many modifications and adaptations of the invention will become apparent to those skilled in the art and it is intended to encompass such obvious modifications and changes in the scope of the claims appended hereto.

What is claimed is:

1. A positioning apparatus, comprising:
   a motor for changing a position of a control object;
   a position detection circuit configured to detect a present position of the control object;
   a stop range setting circuit configured to determine a range of permissible positions around where the control object is desired to be stopped;
   a comparator circuit configured to compare an output from said position detection circuit with upper and lower limit values of the range determined by said stop range setting circuit to output an out-of-range signal and a drive direction indication signal for indicating a drive direction of said motor when the control object is out of the range;
   a drive start determination circuit configured to output a drive permission signal when the out-of-range signal is continuously output in an active state for at least a predetermined period of time, and then to stop an outputting operation of the drive permission signal on the basis of output in a passive state of the out-of-range signal; and
   a drive circuit configured to drive said motor in a direction indicated by the drive direction indication signal while the drive permission signal is output.

2. A positioning apparatus according to claim 1, wherein said drive start determination circuit comprises a plurality of flip-flops or latch circuits which are connected in series with each other and reset when the out-of-range signal is output in the passive state.

3. A positioning apparatus according to claim 1, wherein said drive start determination circuit comprises:
   a time constant circuit having a capacitor;
   a charge/short-circuiting circuit configured to set said capacitor in a charge state when the out-of-range signal is output in the active state, and to short-circuit said capacitor when the out-of-range signal is output in the passive state; and
   a voltage detection circuit configured to output the drive permission signal when a terminal voltage of said capacitor is not lower than a predetermined value.

4. A positioning apparatus, comprising:
   a motor for changing a position of a control object;
   a position detection circuit configured to detect a present position of the control object;
   a stop range setting circuit configured to determine a range of permissible positions around where the control object is desired to be stopped;

a comparator circuit configured to compare an output from said position detection circuit with upper and lower limit values of the range determined by said stop range setting circuit to output an out-of-range signal and a drive direction indication signal for indicating a drive direction of said motor when the control object is out of the range;

a driving continuing circuit configured to continue an outputting operation of a drive permission signal regardless of the out-of-range signal for at least a predetermined period of time from when the out-of-range signal is first output in an active state, and to stop the outputting operation of the drive permission signal on the basis of output in a passive state of the out-of-range signal after the [second] predetermined period of time has passed; and a drive circuit configured to drive said motor in a direction indicated by the drive direction indication signal while the drive permission signal is output.

5. A positioning apparatus according to claim 4, wherein said drive continuing circuit comprises:

a holding circuit provided with a set input which is given a priority and a reset input, the holding circuit receiving the out-of-range signal as a set signal and outputting the drive permission signal;

a time constant circuit having a capacitor;

a charge/short-circuiting circuit configured to set said capacitor in a charge state when the out-of-range signal is output in the active state, and to short-circuit said capacitor when the out-of-range signal is output in the passive state; and a voltage detection circuit configured to reset said holding circuit when a terminal voltage of said capacitor is not lower than a predetermined value.

6. A positioning apparatus, comprising:

a motor for changing a position of a control object;

a position detection circuit configured to detect a present position of the control object;

a stop range setting circuit configured to determine a range of permissible positions around where the control object is desired to be stopped;

a comparator circuit configured to compare an output from said position detection circuit with upper and lower limit values of the range determined by said stop range setting circuit to output an out-of-range signal and a drive direction indication signal for indicating a drive direction of said motor when the control object is out of the range;

a drive condition determination circuit configured to output a drive permission signal when the out-of-range signal is continuously output in an active state for at least a first predetermined period of time, continuing an outputting operation of the drive permission signal regardless of the out-of-range signal for at least a second predetermined period of time from output start of the drive permission signal, and to stop the outputting operation of the drive permission signal on the basis of output in a passive state of the out-of-range signal after the second predetermined period of time has passed; and a drive circuit configured to drive said motor in a direction indicated by the drive direction indication signal while the drive permission signal is output.

7. A positioning apparatus according to claim 6, wherein said drive condition determination circuit comprises:

a drive start determination circuit configured to output a drive start signal when the out-of-range signal is continuously output for at least the first predetermined period of time; and a drive continuing circuit configured to continue the output operation of the drive permission signal regardless of the out-of-range signal for at least the second predetermined period of time from when the drive start signal is first output, and to stop the outputting operation of the drive permission signal on the basis of output in the passive state of the out-of-range signal after the second predetermined period of time has passed.

8. A positioning apparatus according to claim 7, wherein said drive start determination circuit comprises a plurality of flip-flops or latch circuits which are connected in series with each other and reset when the out-of-range signal is output in the passive state.

9. A positioning apparatus according to claim 7, wherein said drive start determination circuit comprises:

a time constant circuit having a capacitor;

a charge/short-circuiting circuit configured to set said capacitor in a charge state when the out-of-range signal is output in the active state, and to short-circuit said capacitor when the out-of-range signal is output in the passive state; and a voltage detection circuit configured to output the drive start signal when a terminal voltage of said capacitor is not lower than a predetermined value.

10. A positioning apparatus according to claim 7, wherein said drive continuing circuit comprises:

a holding circuit provided with a set input which is given a priority and a reset input, the holding circuit receiving the drive start signal as a set signal and outputting the drive permission signal;

a time constant circuit having a capacitor;

a charge/short circuiting circuit configured to set said capacitor in a charge state when the out-of-range signal is output in the active state, and to short-circuit said capacitor when the out-of-range signal is output in the passive state; and a voltage detection circuit configured to reset said holding circuit when a terminal voltage of said capacitor is not lower than a predetermined value.

11. A positioning apparatus according to claim 6, wherein drive condition determination circuit comprises:

a first holding circuit provided with a set input and a reset input which is given a priority, the first holding circuit receiving a reset signal when the out-of-range signal is output in the passive state;

a second holding circuit provided with a set input which is given a priority and a reset input, the second holding circuit receiving an output from said first holding circuit as a set signal and outputting the drive permission signal;

a time constant circuit having a capacitor;

a charge/short-circuiting circuit configured to set said capacitor in a charge state when at least one of the out-of-range signal is output in the active state and the drive permission signal is output, and to short-circuit said capacitor when both of the out-of-range signal is output in the passive state and the drive permission signal are not output;

a first voltage detection circuit configured to set said first holding circuit when a terminal voltage of said capacitor is not lower than a first predetermined value; and a second voltage detection circuit configured to output a reset signal to said second holding circuit when the terminal voltage is not lower than a second predetermined value.

12. A positioning apparatus, comprising:

a motor for changing a position of a control object;

a position detection circuit for detecting a present position of the control object and outputting a position signal;

a stop range setting circuit for determining a range of permissible positions around where the control object is desired to be stopped;

a comparator circuit for comparing the position signal from said position detection circuit with upper and lower limit values of the range determined by said stop range setting circuit, wherein said comparator circuit outputs an out-of-range signal and a rotational direction signal for indicating a rotational direction of said motor when the control object is outside of the range, and outputs a within-range signal and the rotational direction signal when the control object is within the range;

a drive start determination circuit for outputting a drive permission signal when the out-of-range signal is output for a predetermined period of time and stopping an outputting operation of the drive permission signal when the within-range signal is output; and a drive circuit for driving said motor in a rotational direction indicated by the rotational direction signal while the drive permission signal is output.

13. A positioning apparatus according to claim 12, wherein said drive start determination circuit comprises:

a time constant circuit having a capacitor;

a charging/discharging circuit for setting said capacitor in a charge state when the out-of-range signal is output and setting said capacitor in a discharge state when the within-range signal is output; and a voltage detection circuit for outputting the drive permission signal when a terminal voltage of said capacitor is not lower than a predetermined value.

14. A positioning apparatus according to claim 12, wherein the out-of-range signal corresponds to a passive state of a signal and the within-range signal corresponds to an active state of the signal.

15. A positioning apparatus, comprising:

a motor for changing a position of a control object;

a position detection circuit for detecting a present position of the control object and outputting a position signal;

a stop range setting circuit for determining a range of permissible positions around where the control object is desired to be stopped;

a comparator circuit for comparing the position signal from said position detection circuit with upper and lower limit values of the range determined by said stop range setting circuit, wherein said comparator circuit outputs an out-of-range signal and a rotational direction signal for indicating a rotational direction of said motor when the control object is outside of the range, and outputs a within-range signal and the rotational direction signal when the control object is within the range;

a drive condition determination circuit for outputting a drive permission signal when the out-of-range signal is output for a first predetermined period of time, continuing an outputting operation of the drive permission signal for a second predetermined period of time starting from output of the drive permission signal, and stopping the outputting operation of the drive permission signal when the within-range signal is output after the second predetermined period of time has passed; and a drive circuit for driving said motor in a rotational direction indicated by the rotational direction signal while the drive permission signal is output.

16. A positioning apparatus according to claim 15, wherein said drive condition determination circuit comprises:

a drive start determination circuit for outputting a first drive start signal when the out-of-range signal is output for the first predetermined period of time and outputting a second drive start signal otherwise; and a drive continuing circuit for continuing the output operation of the drive permission signal for the second predetermined period of time from when the first drive start signal is output, and stopping the outputting operation of the drive permission signal when the within-range signal is output after the second predetermined period of time has passed.

17. A positioning apparatus according to claim 16, wherein said drive start determination circuit comprises:

a time constant circuit having a capacitor;

a charging/discharging circuit for setting said capacitor in a charge state when the out-of-range signal is output and setting said capacitor in a discharge state when the within-range signal is output; and a voltage detection circuit for outputting the drive start signal when a terminal voltage of said capacitor is not lower than a predetermined value.

18. A positioning apparatus according to claim 16, wherein said drive continuing circuit comprises:

a holding circuit provided with a set terminal, an output terminal and a reset terminal, for receiving the first drive start signal as a set signal and outputting the drive permission signal;

a time constant circuit having a capacitor;

a charging/discharging circuit for setting said capacitor in a charge state when the out-of-range signal is output, and setting said capacitor in a discharge state when the within-range signal is output; and a voltage detection circuit for resetting said holding circuit when a terminal voltage of said capacitor is not lower than a predetermined value.

19. A positioning apparatus according to claim 15, wherein drive condition determination circuit comprises:

a first holding circuit provided with a set terminal, an output terminal and a reset terminal, for receiving a reset signal when the within-range signal is output;

a second holding circuit provided with a set terminal, an output terminal and a reset terminal, for receiving an output from the output terminal of said first holding circuit as a set signal and outputting the drive permission signal from the output terminal thereof;

a time constant circuit having a capacitor;

a charging/discharging circuit for setting said capacitor in a charge state when at least one of the out-of-range signal and the drive permission signal is output and setting said capacitor in a discharge state when both of the out-of-range signal and the drive permission signal are not output;

a first voltage detection circuit for outputting a set signal into the set terminal of said first holding circuit when a terminal voltage of said capacitor is not lower than a first predetermined value; and a second voltage detection circuit for outputting a reset signal into the reset terminal of said second holding circuit when the terminal voltage is not lower than a second predetermined value.

* * * * *

UNITED STATES PATENT AND TRADEMARK OFFICE
CERTIFICATE OF CORRECTION

PATENT NO. : 6,020,708
DATED : February 1, 2000
INVENTOR(S) : Matsumoto *et al.*

It is certified that error appears in the above-indentified patent and that said Letters Patent is hereby corrected as shown below:

On the title page, item [73]: Assignee, after "Nissan Motor Co., Ltd.," please delete "Tokyo, Japan" and insert - -Yokohama-shi, Japan; and Calsonic Corporation, Tokyo, Japan.- -.

Signed and Sealed this

Sixth Day of March, 2001

Attest:

NICHOLAS P. GODICI

Attesting Officer     Acting Director of the United States Patent and Trademark Office